United States Patent [19]

Miner

[11] 3,797,600
[45] Mar. 19, 1974

[54] POWER PACK MOUNT

[75] Inventor: Earl L. Miner, Moran, Kans.

[73] Assignee: Lawlor Industries, Inc., Addison, Ill.

[22] Filed: Apr. 21, 1972

[21] Appl. No.: 246,273

[52] U.S. Cl.............. 180/64 M, 104/34, 180/65 R, 180/68.5, 214/372
[51] Int. Cl....... B60k 5/10, B60l 11/02, B60l 11/18
[58] Field of Search..... 180/68.5, 65 R, 64 R, 64 L, 180/64 M, 11, 60; 105/50, 51; 104/34; 214/384, 372

[56] References Cited
UNITED STATES PATENTS

| 3,150,734 | 9/1964 | Duggar, Jr. | 180/11 |
| 1,681,944 | 8/1928 | Marshall, Jr. | 214/384 |
| 3,688,857 | 9/1972 | Miller | 180/11 X |
| 1,111,510 | 9/1914 | Ward | 180/65 R |

FOREIGN PATENTS OR APPLICATIONS

| 205,275 | 9/1959 | Austria | 180/64 R |
| 1,044,688 | 6/1953 | France | 180/68.5 |

Primary Examiner—David Schonberg
Assistant Examiner—Milton L. Smith
Attorney, Agent, or Firm—Dominik, Knechtel, Godula & Demeur

[57] ABSTRACT

A power pack mount having a generally rectangular-shaped box-like frame with a pair of arms fixedly secured to the opposite sides thereof, in a substantially vertically disposed position. The ends of the arms are adapted to be attached to a pair of rearwardly and downwardly shiftable pivot point attachments on the vehicle in which the power pack mount is installed, whereby the power pack mount can be easily removed from and replaced within the vehicle.

22 Claims, 8 Drawing Figures

3,797,600

PATENTED MAR 19 1974　　3,797,600

POWER PACK MOUNT

This invention relates, generally, to an improved power pack mount supporting a source of power which can be easily removed from and replaced within a vehicle. More particularly, the invention relates to a vehicle requiring a source of power and a power pack mount for supporting the source of power which can be easily and quickly removed from and replaced within the vehicle.

Presently there are numerous vehicles such as floor scrubbers, lawn mowers, sweepers, golf carts and the like which are electrically powered by means of a source of power such as rechargeable batteries or motor generator units. In those cases where batteries are employed, the batteries frequently have to be recharged and/or replaced, after a relatively short period of use. In most cases, the batteries are installed in the vehicle in a fashion such that they can be easily recharged, simply by, for example, plugging the output of a battery charger into an associated electrical coupler provided on the vehicle in a convenient location. However, it will be appreciated that the vehicle is effectively out of service when the batteries are being recharged. If the vehicle is a floor scrubber used by maintenance people in a commercial operation, for example, or a golf cart, the down time of the vehicle during the time that the batteries are being recharged can seriously effect the economics of the commercial operation. The same is true in the case of a golf cart and, in addition, should the batteries need recharging while the golf cart is out on the course, the golf cart necessarily must be towed in or the battery charger transported to the location of the golf cart. In addition, the golfer using the golf cart at the time that the batteries are discharged is inconvenienced, in that she either has to walk or notify the parties in charge of the golf carts of his distress and wait for them to deliver him a freshly charged cart.

As indicated above, the batteries generally are mounted in the vehicles, and are concealed to prevent anyone or some object from accidentally contacting the terminals thereof, thus causing serious harm or damage. In view of the manner in which the batteries are concealed within the vehicle, it is a generally difficult and time consuming job to remove the batteries from the vehicle for recharging and/or replacement. In some cases, the time required to replace the batteries is as great as the time required to recharge them, hence in this case also, the vehicle is effectively out of service for a substantial period of time.

Accordingly, it is an object of the present invention to provide an improved power pack mount which can be easily and quickly removed from and replaced within a vehicle.

Another object of the invention is to provide a power pack mount of the above-described type which can be easily transported, generally in the fashion in which a hand cart is wheeled.

Still another object is to provide an improved power pack mount for supporting a source of power in the form of batteries, a motor generator unit, or an internal combustion engine.

A still further object is to provide a vehicle requiring a source of power and a power pack mount for supporting the source of power for the vehicle, both of a construction such that the power pack mount can be easily and quickly removed from and replaced within the vehicle.

A still further object is to provide a vehicle and a power pack mount of the above-described type wherein the center of gravity of the power pack is positioned within the vehicle such that the weight of the power pack is substantially located over the axle of the vehicle. In this respect, it is further contemplated that the arrangement be such that the power pack mount functions as a counter balance which permits the one end of the vehicle or the housing thereof to be raised in a fashion such that the power pack mount can be seated on a support surface and disengaged from the vehicle.

Other objects of the invention will in part be obvious and will in part appear hereinafter.

For a fuller understanding of the nature and objects of the invention, reference should be had to the following detailed description taken in connection with the accompanying drawings in which.

Similar reference characters refer to similar parts throughout the several views of the drawings.

Figure 1:
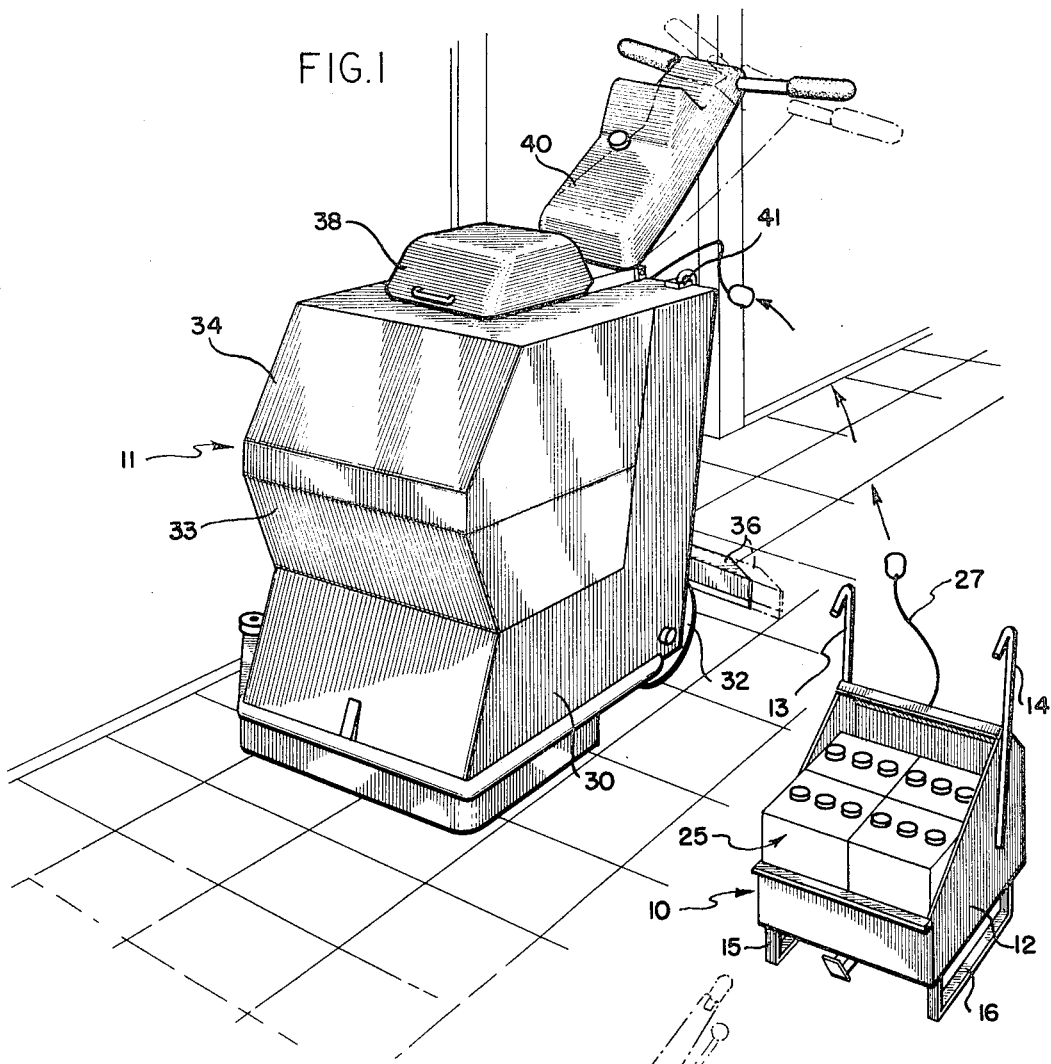
FIG. 1 is a perspective view generally illustrating the power pack mount and a vehicle in the form of a floor scrubber, which is adapted to receive therein the power pack mount.

Referring now to the drawings, in FIG. 1 there is illustrated a power pack mount 10 exemplary of the invention, together with a vehicle 11 which, in the illustrated embodiment, comprises a floor scrubber 11. The power pack mount 10 includes a generally rectangular-shaped box-like frame 12 having a pair of arms 13 and 14 fixedly secured to the opposite sides thereof, in a substantially vertically disposed position. The ends of the arms 13 and 14 each are generally J-shaped, for attachment with a pair of pivot point adjustments 41 (only one of which is shown) on the vehicle or floor scrubber 11, in the manner described more fully below.

The power pack mount further has a pair of U-shaped brackets 15 and 16 affixed to the bottom of its box-like frame 12, for supporting the power pack mount in a raised position from a supporting surface. A pair of wheels 17 are affixed to the U-shaped brackets 15 and 16, near the rear of the box-like frame 12, for transporting the power pack mount 10. In this respect, the arms 13 and 14 can be used to tilt the power pack mount 10 onto the wheels 17, so that the power pack mount can be generally wheeled like a hand cart.

Beneath the box-like frame 12 and disposed between the U-shaped brackets 15 and 16, there is provided a lever arm 18 which is pivotally supported by means of a lever arm support bracket 19 secured to the bottom of the box-like frame 12. The lever arm 18 has a biasing spring 20 affixed to it, for biasing the lever arm 18 in a fashion such that a locking plate 21 will automatically lockingly engage with a locking bar 39 provided within the vehicle or floor scrubber 11, in a fashion and for reasons described more fully below.

Figure 5:
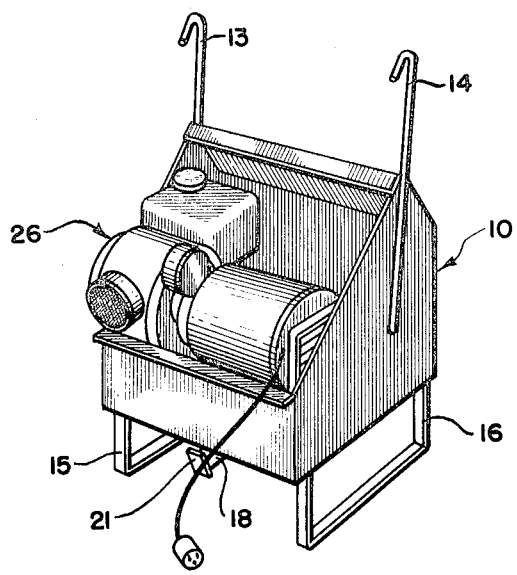
FIG. 5 is a perspective view of the power pack mount supporting, in this case, a motor generator unit.

The power pack mount 10, as illustrated in FIG. 1, includes a number of batteries 25 (four as illustrated), for providing electrical power for the vehicle or floor scrubber 11. While in the specifically illustrated embodiment, the power pack mount 10 supports batteries 25, the power pack mount can as well support a motor generator unit 26, as illustrated in FIG. 5. Further still, while not illustrated, an internal combustion engine can be supported within the power pack mount 10. The batteries 25 are electrically coupled to the vehicle or floor scrubber 11, by means of an electrical connector cord 27, which is adapted to be coupled to its corresponding part provided on the floor scrubber.

The vehicle or floor scrubber 11 includes a generally L-shaped housing 30 which is pivotal about an axle 31 which is rotatably supported within a frame member (not shown) of the floor scrubber and has a pair of wheels 32 affixed thereto for transporting the floor scrubber. Seated within the crotch of the L-shaped housing is a clean water tank 33 and a dirty water tank 34. The clean water tank 33 supplies water to a scrubber brush 35 rotatably mounted on the frame member of the floor scrubber. Attached to the rear of the floor scrubber 11 is a squeegee bar 36 and a vacuum hose 37 is coupled thereto for vacuuming up the dirty water collected by the squeegee bar 36, for delivery of the same into the dirty water tank 34. A vacuum pump (not shown) is secured within the top of the dirty water tank 34 and is covered by the vacuum pump cover 38.

A handle 40 is adjustably affixed to the housing 30 of the floor scrubber 11 for steering it. In addition, the handle is coupled to the squeegee bar 36 and is adapted to raise and lower the squeegee bar from an operable position on the floor, to a scrub position where the squeegee bar is out of engagement with the floor and to a raised position to permit the floor scrubber to be tilted rearwardly, as the handle is correspondingly adjustably positioned.

Figure 2:
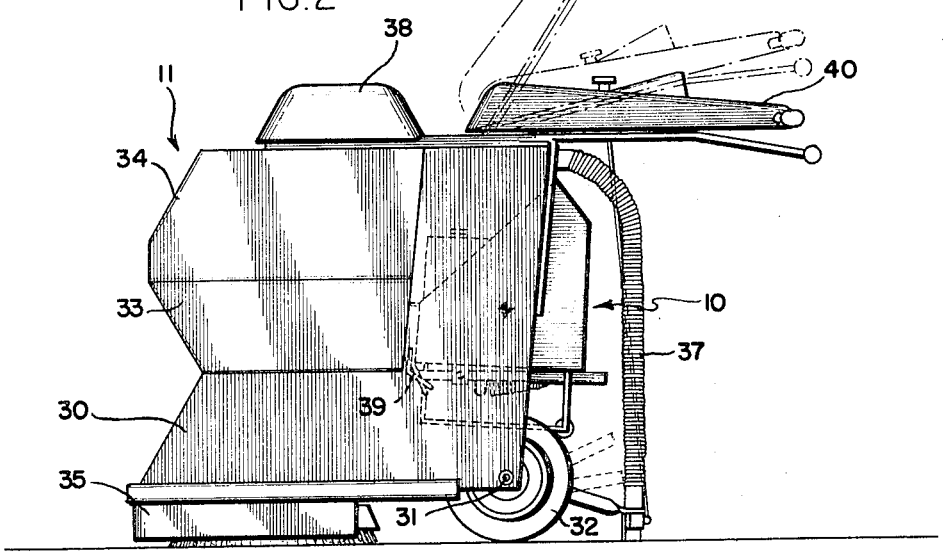
FIG. 2 is a side plan view of the floor scrubber of FIG. 1, with the power pack mount installed therein.

The rear of the L-shaped housing 30 of the floor scrubber 11 is opened, and is adapted to receive the power pack mount 10 therein. As can be best seen in FIG. 2, the power pack mount is affixed within the floor scrubber 11 by engaging the J-shaped ends of the arms 13 and 14 within the pivot point attachments 41 on the top of the L-shaped housing 30. These pivot point attachments 41 are simply a bushing or the like having an opening therein of a diameter such as to permit the ends of the arms 13 and 14 to extend into them. With the ends of the arms 13 and 14 engaged within the pivot point attachments 41, the power pack mount 10 can pivotally swing about the ends of the arms 13 and 14. To complete the installation of the power pack mount 10 within the floor scrubber 11, the power pack mount is pivotally swung forward until the locking plate 21 on the end of the lever arm 18 lockingly engages with the locking bar 39 provided within the L-shaped housing 30 of the floor scrubber. The locking plate 21 slidably engages the locking bar 39 as the power pack mount 10 swings forward and causes the lever arm 18 to pivot within the lever arm support bracket 19, and as the locking plate 21 passes over the locking bar 39, the biasing spring 20 forces the lever arm 18 downwardly to lockingly engage the locking plate behind the locking bar 39. When installed within the L-shaped housing of the floor scrubber 11, it may be noted that the center of gravity of the power pack mount 10 is disposed in a position substantially vertically above the axle 31 of the floor scrubber so that the weight of the power pack is substantially located over the axles, thus effectively balancing the weight of the floor scrubber 11.

Figure 3:
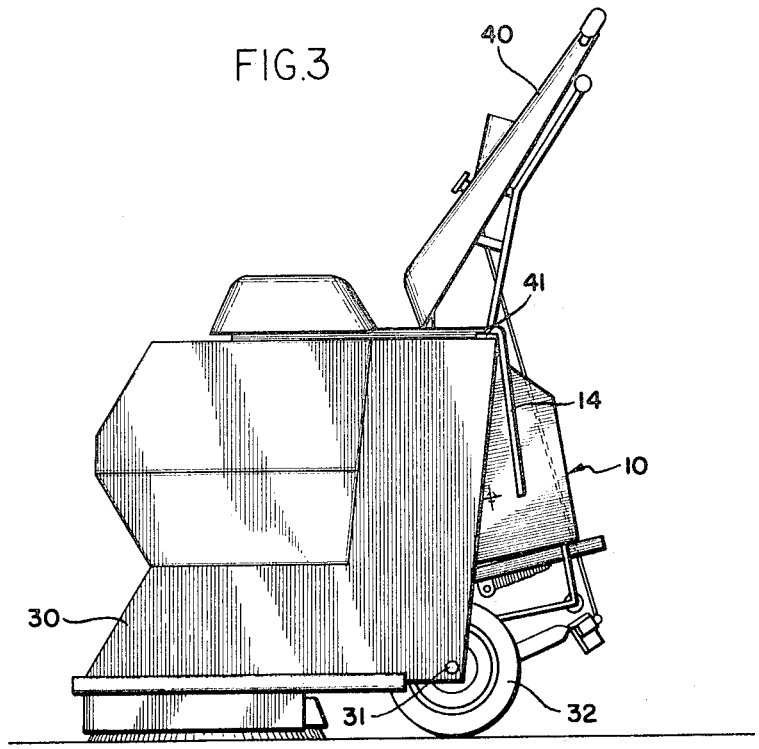
FIG. 3 is a side plan view of the floor scrubber of FIG. 1, generally illustrating the power pack in its released position within the floor scrubber, during removal.

The power pack mount 10 is easily and quickly removed from the floor scrubber 11 by first disengaging the locking plate 21 on the end of the lever arm 18 from the locking bar 39. This can be accomplished by simply pressing downwardly, with the hand or foot, on the end of the lever arm 18. When the power pack mount 10 is released in the above-described manner, it will swing rearwardly about the ends of the arms 13 and 14 within the pivot point attachments 41, to a position generally illustrated in FIG. 3. In this position, it may be noted that the center of gravity of the power pack mount 10 is disposed substantially vertically below the pivot point attachments 41 and rearwardly of the axle 31 of the floor scrubber 11. In this position, the power pack mount 10 generally provides a counter balance which permits the front end of the floor scrubber 11 to be raised, with the L-shaped housing 30 pivoting about the axle 31.

Figure 4:
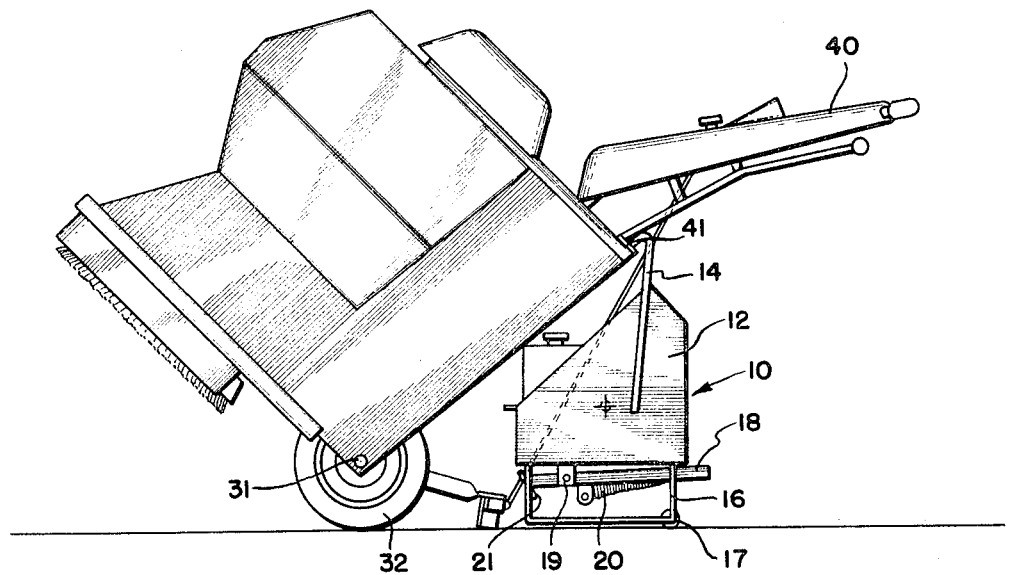
FIG. 4 is a side plan view generally illustrating the manner in which the power pack mount is seated upon a support surface, to remove the same from and to disengage it with the floor scrubber.

After releasing the power pack mount 10, as described above, the floor scrubber 11 is tilted rearwardly, about the axle 31, until the U-shaped brackets 15 and 16 on the bottom of the power pack mount 10 engage with a supporting surface, generally as illustrated in FIG. 4. In tilting the L-shaped housing 30 rearwardly and downwardly, as illustrated, it may be noted that the pivot point attachments 41 likewise are shifted rearwardly and downwardly, while the center of gravity of the power pack mount remains substantially vertically disposed below these pivot point attachments.

Once the power pack mount 10 is seated upon a support surface, the ends of the arms 13 and 14 are disengaged from the pivot point attachments 41, as these pivot point attachments are continued to be shifted rearwardly and downwardly by tilting the L-shaped housing 30.

Another power pack mount 10 can be easily and quickly replaced within the floor scrubber 11, by reversing the above procedure. That is, the floor scrubber 11 is pivoted rearwardly as illustrated in FIG. 4, to permit the ends of the arms 13 and 14 of the power pack mount 10 to be engaged within the pivot point attachments 41. Once engaged, the L-shaped housing and hence the pivot point attachments 41, are pivoted upwardly and forwardly to the position illustrated in FIG. 3, with the power pack mount 10 positioned with its center of gravity disposed substantially vertically below the pivot point attachments 41. Thereafter, the power pack mount 10 is simply pivotally swung forward, to again lockingly engage the locking plate 21 with the locking bar 39, to complete the installation thereof.

From the above description, it can be seen that the pivot point attachments 41 for the power pack mount 10 effectively form shiftable pivot point attachments which can be shifted rearwardly and downwardly, or conversely, upwardly and forwardly, to permit the ends of the arms 13 and 14 affixed to the power pack mount 10 to be engaged within the pivot point attachments 41, to install the power pack mount 10 within the floor scrubber 11. In the construction of the floor scrubber 11 or any vehicle in which the power pack mount 10 is installed, the pivot point attachments 41 preferably and advantageously are positioned rearwardly and above the axle 31, that is, the pivot point about which the vehicle is pivoted rearwardly. By positioning the pivot point attachments 41 in this fashion, the center of gravity of the power pack mount 10 likewise is disposed rearwardly and above the axle 31 so that the power pack mount 10 functions as a counter balance to permit the vehicle to be more easily tilted rearwardly, in the manner described above. Also, means preferably are provided so that the power pack mount 10 can be releasably secured within the housing of the vehicle, with its center of gravity disposed substantially vertically above the axle of the vehicle, to thereby effectively balance the weight distribution of the vehicle.

Figure 6:
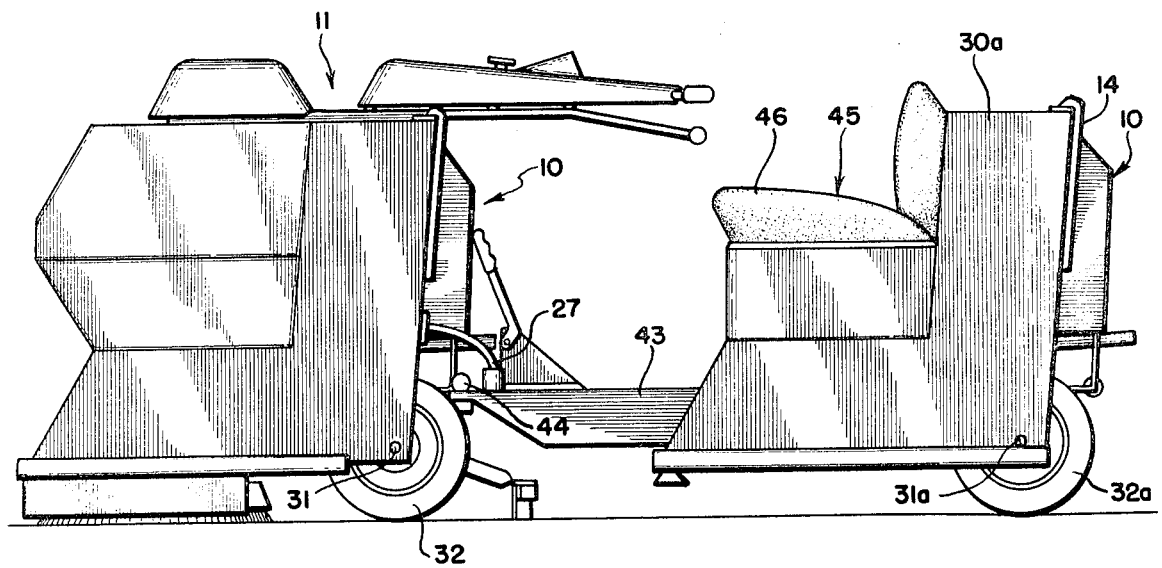
FIG. 6 is a side plan view of a floor scrubber of the type illustrated in FIG. 1 having a cart for an operator hitched thereto, one or both of which may have a power pack mount installed therein.

In FIG. 6, there is illustrated a riding cart 45 having a tongue 43 which is adapted to be coupled to a ball hitch 44 provided on a floor scrubber 11, whereby an operator can ride behind the floor scrubber during its operation. The riding cart 45 has an L-shaped housing 30a which is generally of the same construction as the L-shaped housing 30 of the floor scrubber 11. A seat 46 is provided within the crotch of the L-shaped housing 30a, for the operator. A pair of wheels 32a are affixed to an axle 31a which again is supported by the frame member (not shown) of the riding cart 45 and about which the riding cart 45 can be pivoted rearwardly.

The floor scrubber 11 can have a power pack mount 10 installed therein in the manner described above for providing electrical power for the floor scrubber. In addition, a similar power pack 10 can be affixed to the riding cart 45 in a like fashion. With this arrangement, the power pack 10 installed within the floor scrubber 11 can be utilized until the batteries 25 are discharged. The power pack mount 10 carried by the riding cart 45 can be used to replace the discharged power pack mount within the floor scrubber 11 or, alternatively, the electrical cord connector 27 can be coupled with an appropriate electrical coupler (not shown) which is electrically coupled to the power pack affixed to the riding cart 45. When the batteries of one or both of the power pack mounts 10 are to be recharged or replaced, they can be removed from the floor scrubber 11 and the riding cart 45, in the manner described above.

Figure 7:
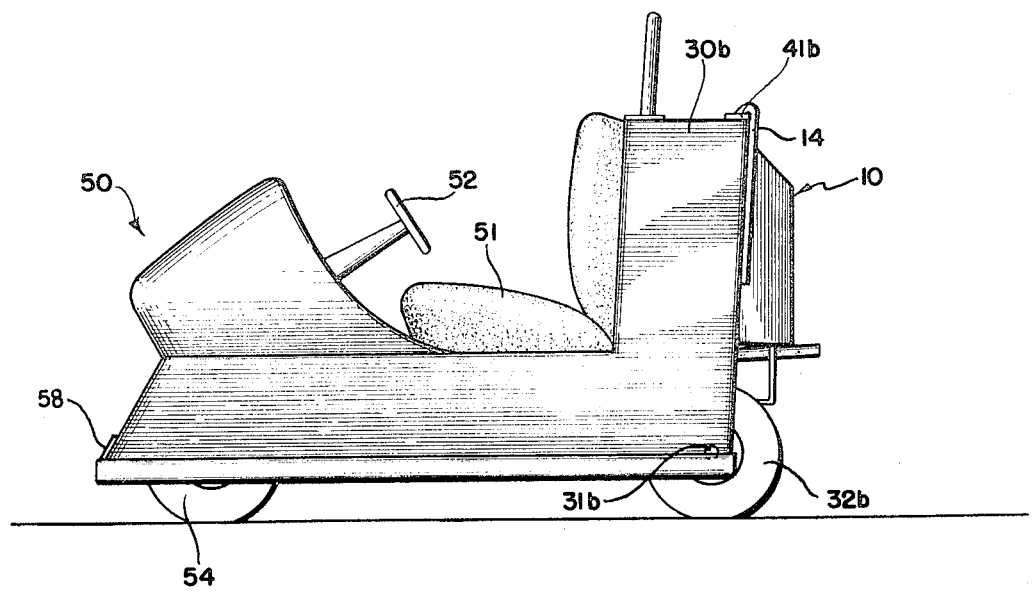
FIG. 7 is a side plan view of another vehicle in the form of a golf cart having a power pack mount installed therein.
Figure 8:
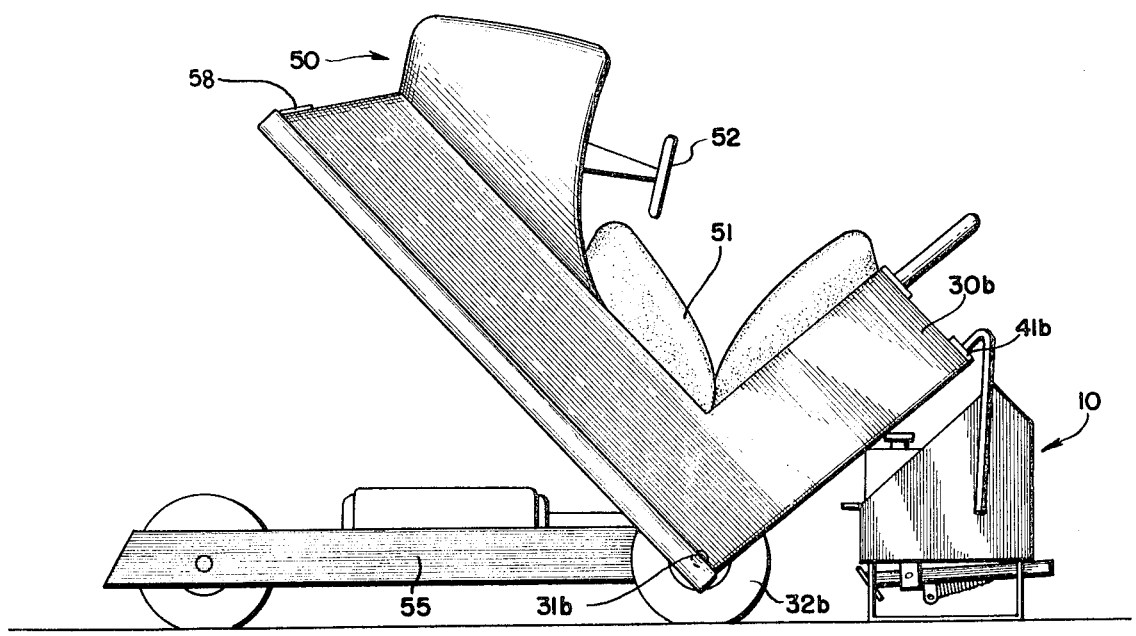
FIG. 8 is a side plan view of the golf cart of FIG. 7, generally illustrating the manner in which the power pack mount is removed from and replaced within the golf cart.

In each of the above-described illustrated embodiments of the invention, the power pack mounts have been associated with a floor scrubber 11. It will be appreciated, however, the the power pack mounts 10 can be used in various different types of vehicles such as, for example, the golf cart 50 illustrated in FIGS. 7 and 8. As illustrated, the golf cart 50 includes a generally L-shaped housing 30b which is again like the L-shaped housing of the floor scrubber 11, except that its horizontal leg can be extended to provide room for a seat 51 and a steering wheel assembly 52. A front wheel or wheels 54 are affixed to the frame member 55 of the golf cart 50, and are coupled with the steering wheel 52 for steering the golf cart. The rear wheels 32b of the golf cart 50 are affixed to the axle 31b which likewise is supported by the frame member 55 of the golf cart 50. The pivot point attachments 41b are affixed to the L-shaped housing 40 and, as described above, preferably and advantageously are located rearwardly and above the axle 31b, for the reasons discussed above. The power pack mount 10 is installed and positioned within the L-shaped housing 30b of the golf cart 50, as described above, with its center of gravity substantially vertically disposed over the axle 31b of the golf cart.

In this case, the pivot point attachments 41 are shiftable rearwardly and downwardly to disengage the power pack mount 10 in the manner described above, by releasably disengaging the front of the L-shaped housing 30 and pivoting only the L-shaped housing 30 about the axle 31b. Accordingly, the power pack mount 10 is removed from and replaced within the vehicle or golf cart 50 in the same fashion as described above in the case of the floor scrubber 11, except for the fact that only the housing 31b is pivoted, rather than the entire vehicle.

Accordingly, it can be seen from the above description that a power pack mount 10 which can be easily and quickly removed from or replaced within a vehicle is provided. As to the vehicle in which the power pack mount 10 is installed, the latter preferably includes a generally L-shaped housing having pivot point attachments for the arms 13 and 14 of the power pack mount which are shiftable rearwardly and downwardly, by either pivoting the entire vehicle rearwardly or by simply pivoting the L-shaped housing of the vehicle rearwardly. Alternatively, the pivot point attachments 41 can be affixed to an adjustable mechanism which is operable to shift these pivot point attachments rearwardly and downwardly to releasably disengage the power pack mount 10 from the vehicle, rather than tilting the vehicle and/or its housing. Also, as indicated above, the power pack mount 10 can as well support a motor generator unit or an internal combustion engine rather than batteries, for supplying a source of power for the vehicle.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In combination, a vehicle requiring a source of power and a power pack mount for supporting said source of power, said vehicle comprising shiftable pivot point attachments for said power pack mount, said power pack mount supporting said source of power and having a pair of upwardly extending arms with the free ends thereof formed to engage with respective ones of said pivot point attachments to affix said power pack mount to said vehicle with the center of gravity thereof substantially vertically disposed below said shiftable pivot point attachments, said shiftable pivot point attachments being shifted rearwardly and downwardly to thereby cause said power pack mount to swing free from said vehicle and to be seated on a supporting surface, said arms being releasably disengaged from said pivot point attachments as the latter are further shifted rearwardly and downwardly after said power pack mount is seated on a supporting surface to automatically release said power pack mount from said vehicle.

2. The combination of claim 1, wherein said power pack mount is easily and quickly replaced within said vehicle by engaging said arms with said pivot point attachments and shifting the latter upwardly and forwardly.

3. The combination of claim 1, further including means for releasably securing said power pack mount within said vehicle with the center of gravity thereof positioned forward of said shiftable pivot point attachments, whereby said power pack mount when released from within said vehicle pivotally swings to a substantially vertically disposed position with respect to said pivot point attachments.

4. The combination of claim 3, wherein said means for releasably securing said power pack mount within said vehicle comprises a locking bar affixed to one of said vehicle and said power pack mount and a lever arm for releasably engaging with said locking bar affixed to the other one thereof, said lever arm being biased to automatically lockingly engage with said locking bar when said power pack mount is pivotally swung into said vehicle to secure said power pack mount in position with its center of gravity forward of said pivot point attachments.

5. The combination of claim 1, wherein said pivot point attachments are shiftable rearwardly and downwardly by raising the end of said vehicle opposite the end of which said power pack mount is affixed.

6. The combination of claim 1, wherein said vehicle comprises a frame member, wheels for moving said vehicle supported by said frame member and a housing for generally enclosing the operative elements thereof, said pivot point attachments being formed with said housing and said housing being pivotally swingable with respect to said frame member to shift said pivot point attachments rearwardly and downwardly to permit said power pack mount to be removed and replaced within said vehicle.

7. The combination of claim 1, wherein said vehicle comprises a frame member, at least one of said pair of wheels for moving said vehicle rotatably secured to an axle supported by said frame member and a housing for generally enclosing the operative elements thereof, said pivot point attachments being formed with said housing above rearwardly of said axle, said power pack mount being releasably secured within said vehicle with the center of gravity thereof positioned forward of said pivot point attachments and generally vertically disposed above said axle, whereby the weight of said power pack mount is substantially located over said axle when installed within said vehicle.

8. The combination of claim 7, wherein said pivot point attachments are shiftable rearwardly and downwardly by raising the end of said vehicle opposite the end at which said power pack mount is affixed, said power pack mount when released from within said vehicle pivotally swinging to a position with its center of gravity substantially vertically disposed with respect to said pivot point attachments and rearwardly of said axle, thereby providing a counter balance which permits the end of said vehicle to be more easily raised.

9. The combination of claim 7, wherein said housing is pivotally swingable about said axle with respect to said frame member to shift said pivot point attachments rearwardly and downwardly, said power pack mount when released from within said vehicle pivotally swinging to a position with its center of gravity substantially vertically disposed with respect to said pivot point attachments and rearwardly of said axle, thereby providing a counter balance which permits the end of said housing to be more easily raised.

10. The combination of claim 1, wherein said power pack mount further includes at least one pair of wheels rotatably secured to it, whereby said power pack mount can be transported by rolling it on said wheels.

11. The combination of claim 1, wherein said power pack mount comprises a generally box-like frame for supporting therein said source of power, said pair of arms being fixedly secured to the opposite sides of said box-like frame.

12. The combination of claim 1, wherein said pivot point attachments comprises a pair of hole-like openings in said vehicle, the upper free ends of said arms of said power pack mount being generally J-shaped and formed to seat within said hole-like openings to releasably affix said power pack mount to said vehicle.

13. The combination of claim 1, wherein said source of power supported by said power pack mount comprises batteries for supplying electrical power for said vehicle.

14. The combination of claim 1, wherein said source of power supported by said power pack mount comprises a motor generator unit for supplying electrical power for said vehicle.

15. The combination of claim 1, wherein said source of power supported by said power pack mount comprises an internal combustion engine.

16. A power pack mount for use in combination with a vehicle requiring a source of power, said vehicle having shiftable pivot point attachments for releasably affixing said power pack mount thereto, said power pack mount supporting said source of power and comprising a pair of upwardly extending arms with the free ends thereof formed to engage with respective ones of said pivot point attachments to releasably affix said power pack mount to said vehicle with the center of gravity thereof substantially vertically disposed below said shiftable pivot point attachments, whereby said power pack mount can be disengaged from said vehicle by shifting said pivot point attachments rearwardly and downwardly to cause said power pack mount to swing free from said vehicle and to be seated on a supporting surface, said arms being releasably disengaged from said pivot point attachments as the latter are further shifted rearwardly and downwardly to automatically release said power pack mount from said vehicle, whereby said power pack mount can be easily and quickly removed from and replaced within said vehicle.

17. The power pack mount of claim 16, wherein said power pack mount further includes at least one pair of wheels rotatably secured to it, whereby said power pack mount can be transported by rolling it on said wheels.

18. The combination of claim 16, wherein said power pack mount comprises a generally box-like frame for supporting therein said source of power, said pair of arms being fixedly secured to the opposite sides of said box-like frame.

19. The combination of claim 16, wherein said pivot point attachments comprise a pair of hole-like openings in said vehicle, the upper free ends of said arms of said power pack mount being generally J-shaped and formed to seat within said hole-like openings to releasably affix said power pack mount to said vehicle.

20. The combination of claim 16, wherein said source of power supported by said power pack mount comprises batteries for supplying electrical power for said vehicle.

21. The combination of claim 16, wherein said source of power supported by said power pack mount comprises a motor generator unit for supplying electrical power for said vehicle.

22. The combination of claim 16, wherein said source of power supported by said power pack mount comprises an internal combustion engine.

* * * * *